(12) United States Patent
Rapp et al.

(10) Patent No.: US 10,919,359 B2
(45) Date of Patent: Feb. 16, 2021

(54) CONNECTING STRUT

(71) Applicant: Dr. Ing. h.c. F. Porsche Aktiengesellschaft, Stuttgart (DE)

(72) Inventors: Gustav Rapp, Murr (DE); Boris Schmidt, Karlsruhe (DE); Eric Begenau, Stuttgart (DE)

(73) Assignee: Dr. Ing. h.c. F. Porsche Aktiengesellschaft

( * ) Notice: Subject to any disclaimer, the term of this patent is extended or adjusted under 35 U.S.C. 154(b) by 113 days.

(21) Appl. No.: 16/170,221

(22) Filed: Oct. 25, 2018

(65) Prior Publication Data

US 2019/0168564 A1 Jun. 6, 2019

(30) Foreign Application Priority Data

Dec. 4, 2017 (DE) .......................... 10 2017 128 691

(51) Int. Cl.
*B60G 21/055* (2006.01)
*B60G 7/00* (2006.01)

(52) U.S. Cl.
CPC ......... *B60G 21/0551* (2013.01); *B60G 7/001* (2013.01); *B60G 2204/8302* (2013.01); *B60G 2206/012* (2013.01); *B60G 2206/11* (2013.01); *B60G 2206/7101* (2013.01)

(58) Field of Classification Search
CPC ............................ B60G 21/0551; B60G 7/001; B60G 2206/11; B60G 2206/012; B60G 2206/7101; B60G 2204/8302; B60G 2206/011

See application file for complete search history.

(56) References Cited

U.S. PATENT DOCUMENTS

| | | | | |
|---|---|---|---|---|
| 369,883 | A * | 9/1887 | Richards | F16C 7/023 |
| | | | | 74/594 |
| 3,370,483 | A * | 2/1968 | Ditlinger | B64C 27/327 |
| | | | | 74/579 R |
| 3,475,988 | A * | 11/1969 | Ditlinger | F16C 7/026 |
| | | | | 74/579 R |
| 4,183,261 | A * | 1/1980 | Eiselbrecher | B29C 53/564 |
| | | | | 74/579 R |
| 4,300,410 | A * | 11/1981 | Raghupathi | B29C 53/564 |
| | | | | 156/172 |
| 4,411,114 | A * | 10/1983 | Wurtinger | F16O 7/026 |
| | | | | 403/267 |

(Continued)

FOREIGN PATENT DOCUMENTS

DE 102012211019 A1 1/2014
DE 102013007284 A1 10/2014

*Primary Examiner* — Paul N Dickson
*Assistant Examiner* — Timothy Wilhelm
(74) *Attorney, Agent, or Firm* — RatnerPrestia (57) ABSTRACT

A connecting strut of a motor vehicle having a hollow body which is formed from a fiber reinforced plastic. The hollow body has a first bearing body which is positioned at a first end of the hollow body, and a second bearing body which is positioned at a second end of the hollow body. Straps absorb at least tensile forces, which straps are guided on the bearing bodies and extend, starting from a respective bearing body, along the hollow body in the direction of a respective opposite bearing body. An outer shell is formed from a fiber reinforced plastic and surrounds the hollow body, the bearing bodies and the straps on the outside at least in sections.

15 Claims, 6 Drawing Sheets

(56) References Cited

U.S. PATENT DOCUMENTS

| | | | | |
|---|---|---|---|---|
| 4,603,084 | A * | 7/1986 | Drachenberg | B29C 53/70 156/166 |
| 4,671,336 | A * | 6/1987 | Anahara | B22D 19/14 164/110 |
| 4,811,626 | A * | 3/1989 | Bezin | B62M 3/00 74/594.1 |
| 4,841,801 | A * | 6/1989 | Tice | F16C 7/026 123/197.3 |
| 4,857,124 | A * | 8/1989 | Shobert | B29O 53/582 156/149 |
| 4,992,313 | A * | 2/1991 | Shobert | B29O 53/582 428/36.1 |
| 5,397,272 | A * | 3/1995 | Smiley | F16O 3/026 138/109 |
| 5,435,869 | A * | 7/1995 | Christensen | B29C 53/564 156/169 |
| 6,116,113 | A * | 9/2000 | Pazdirek | B29O 53/585 74/579 R |
| 6,202,505 | B1 * | 3/2001 | Auberon | B29C 33/52 74/579 R |
| 6,324,940 | B1 * | 12/2001 | Pazdirek | B29O 53/585 174/47 |
| 6,564,675 | B1 * | 5/2003 | Jiang | B62K 19/16 74/579 R |
| 7,013,753 | B2 * | 3/2006 | Valle | B62K 19/16 74/594.1 |
| 7,028,998 | B2 * | 4/2006 | Daily | B60G 21/055 267/148 |
| 8,024,993 | B2 * | 9/2011 | Dal Pra | B29C 70/86 74/594.1 |
| 8,777,162 | B2 * | 7/2014 | Benthien | B64C 1/064 244/131 |
| 8,777,244 | B2 * | 7/2014 | Seethaler | B60G 3/06 280/124.145 |
| 8,793,965 | B2 * | 8/2014 | Kurath-Grollmann | B28B 13/021 428/188 |
| 8,863,616 | B2 * | 10/2014 | Ciavatta | B62M 3/00 74/594.1 |
| 9,090,289 | B2 * | 7/2015 | Heise | B62D 25/00 |
| 9,259,878 | B2 * | 2/2016 | Valembois | B29O 53/564 |
| 9,393,850 | B2 * | 7/2016 | Kuroda | B29C 45/0025 |
| 9,616,725 | B2 * | 4/2017 | Kuroda | B60G 7/001 |
| 9,751,564 | B2 * | 9/2017 | Muehlhausen | B62D 65/12 |
| 10,220,666 | B2 * | 3/2019 | Kuroda | B60G 21/055 |
| 10,487,869 | B2 * | 11/2019 | Beale | F16C 3/026 |
| 2007/0199403 | A1 * | 8/2007 | Ciavatta | B62M 3/00 74/594.1 |
| 2019/0133807 | A1 * | 5/2019 | Siewert | A61F 5/0127 |

* cited by examiner

CONNECTING STRUT

CROSS-REFERENCE TO RELATED APPLICATION

This application claims priority to German Patent Application No. DE 10 2017 128 691.8, filed Dec. 4, 2017, which is incorporated by reference herein in its entirety.

FIELD OF THE INVENTION

The invention relates to a connecting stat of a motor vehicle.

BACKGROUND OF THE INVENTION

DE 10 2013 007 284 A1, which is incorporated by reference herein, has disclosed a connecting strut of a motor vehicle, which connecting strut is used, for example, as a chassis component, in particular as a brace, antiroll bar or the like. The connecting strut which is known from this prior art has a rod section, the two ends of the rod section forming bearing sockets which run in each case transversely with respect to a longitudinal axis of the rod section. The connecting strut from DE 10 2013 007 284 A1 is manufactured at least partially from a fiber reinforced plastic which is formed at least partially by way of prepregs.

SUMMARY OF THE INVENTION

There exists a need for improving a connecting strut of a motor vehicle, which connecting strut is configured, in particular, as a chassis link, in such a way that tensile forces and compressive forces can be absorbed in an improved manner by said connecting strut. Described herein is a novel connecting strut.

The connecting strut according to aspects of the invention has a hollow body which is formed from a fiber reinforced plastic.

Furthermore, the connecting strut according to aspects of the invention has bearing bodies, a first bearing body being positioned at a first end of the hollow body, and a second bearing body being positioned at a second end of the hollow body.

Furthermore, the connecting strut according to aspects of the invention has straps for absorbing at least tensile forces, the straps being guided on the bearing bodies and extending, starting from a respective bearing body, along the hollow body in the direction of a respective opposite bearing body.

Furthermore, the connecting strut according to aspects of the invention has an outer shell which is formed from a fiber reinforced plastic and surrounds the hollow body, the bearing bodies and the straps on the outside at least in sections.

The connecting strut according to aspects of the invention comprising the hollow body, the bearing bodies, the straps and the outer shell can absorb in an optimum manner tensile forces and compressive forces which act on the connecting strut during operation.

The hollow body is preferably contoured in an arch-like manner in cross section. Compressive forces which act on the connecting strut during operation can thus be absorbed particularly advantageously.

According to one development of the invention, at least 70% and at most 90% of fibers of the hollow body are provided by unidirectional fibers, and the rest are provided by fibers of a multidirectional woven fiber fabric or knitted fiber fabric. At least 40% and at most 60% of fibers of the outer shell are provided by unidirectional fibers, and the rest are provided by fibers of a multidirectional woven fiber fabric or knitted fiber fabric. The bearing bodies are configured as metallic elements, around which unidirectional fibers and/or unidirectional straps are wound. Tensile forces and compressive forces which act on the connecting strut during operation can be absorbed in an optimum manner by way of a construction of this type of the connecting strut.

According to one development, inserts made from fiber reinforced plastic are positioned between the ends of the hollow body and the bearing bodies, fibers of the inserts being provided by fibers of a multidirectional woven fiber fabric or knitted fiber fabric, and the straps which are guided on the bearing bodies and which extend along the hollow body starting from a respective bearing body covering the inserts at least in sections. The inserts serve for the optimum force introduction of compressive forces into the hollow body.

According to one development, the hollow body and the outer shell and the possibly present inserts are formed in each case from a carbon fiber reinforced plastic. The straps consist in each case of carbon fibers. Compressive forces which act on the connecting strut during operation can thus be absorbed particularly advantageously.

BRIEF DESCRIPTION OF THE DRAWING FIGURES

Preferred developments of the invention result from the subclaims and the following description. Exemplary embodiments of the invention will be described in greater detail using the drawing, without being restricted hereto. In the drawing:

DETAILED DESCRIPTION OF THE INVENTION

FIGS. 1 to 4 show different views and details of a first connecting strut 10 according to aspects of the invention of a motor vehicle, which connecting strut 10 is preferably configured as a link of a chassis.

The connecting strut 10 from FIGS. 1 to 4 has a hollow body 11 which is formed from a fiber reinforced plastic.

As viewed in the longitudinal direction of the rod-like hollow body 11, a first bearing body 12 is positioned at a first end of the hollow body 11, and a second bearing body 13 is positioned at an opposite second end of the hollow body 11.

The bearing bodies 12, 13 provide bearing sockets 14. Bearing pins 15 extend through the bearing sockets 14 of the bearing bodies 12, 13, which bearing pins 15 serve to attach the connecting strut 10 to assemblies (not shown) of a motor vehicle, in particular of a chassis of a motor vehicle.

In addition to the hollow body 11 and the bearing bodies 12, 13, the connecting strut 10 has unidirectional straps or UD straps 16 which serve at least to absorb at least tensile forces which act on the connecting strut 10 during operation.

The straps 16 are guided on the bearing bodies 12, 13 and extend, starting from a respective bearing body 12, 13, along the hollow body 11 in the longitudinal direction thereof in the direction of the respective opposite bearing body 13, 12.

Furthermore, the connecting strut 10 has an outer shell 17. The outer shell 17 is formed from a fiber reinforced plastic. The outer shell 17 surrounds the hollow body 11, the bearing bodies 12, 13 and the straps 16 on the outside at least in sections. Here, the outer shell 17 leaves the bearing sockets 14 free for the passage of the bearing pins 15 in the region of the bearing bodies 12, 13.

As has already been stated, the hollow body 11 of the connecting strut 10, at the opposite ends of which hollow body 11 in each case one bearing body 12, 13 is arranged, is formed from a fiber reinforced plastic.

Here, at least 70% and at most 90% of fibers of said hollow body 11 are provided by unidirectional fibers, and the rest are provided by fibers of a multidirectional woven fiber fabric or knitted fiber fabric. 80% or approximately 80% of the fibers of the hollow body 11 are particularly preferably provided by unidirectional fibers, and 20% of the rest or approximately 20% of the rest are provided by fibers of a multidirectional woven fiber fabric or knitted fiber fabric. Here, said fibers are embedded in a matrix material made from plastic.

All of the unidirectional fibers preferably extend in the longitudinal direction of the hollow body 11 and therefore of the connecting strut. The fibers of the multidirectional woven fiber fabric or knitted fiber fabric cross one another and preferably run transversely with respect to the longitudinal direction.

The hollow body 11 is provided by the fibers which are to provide the hollow body 11 being wound around a core which is made, for example, from a foam material, said fibers being embedded in a matrix material made from plastic.

Subsequently, the core made from the foam material is removed via an opening 11a in the hollow body 11, with the result that the hollow body 11 then has a cavity 11b. The opening 11a is closed by a plug 11c.

The bearing bodies 12, 13 which are positioned at the two ends of the hollow body 11 are preferably configured as metallic elements which are preferably made from stainless steel and around which unidirectional fibers and/or unidirectional straps 18 are wound.

Here, the bearing bodies 12, 13 are formed by metallic rings which, on the outer side thereof, have a groove 19 for receiving preferably unidirectional straps 18.

Figure 5A:
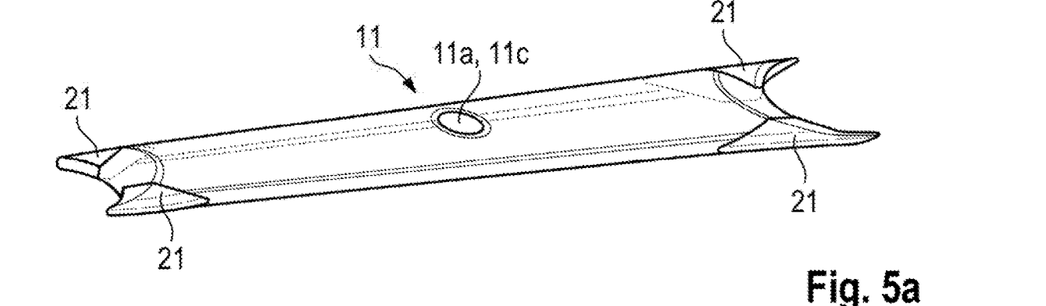
FIGS. 5a-g show different manufacturing steps during the assembly of the connecting strut from FIGS. 1 to 4.
Figure 5B:
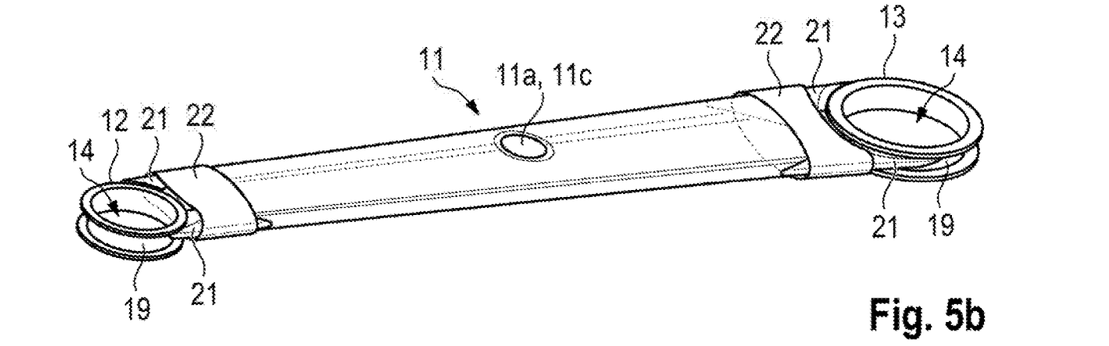
Figure 5C:
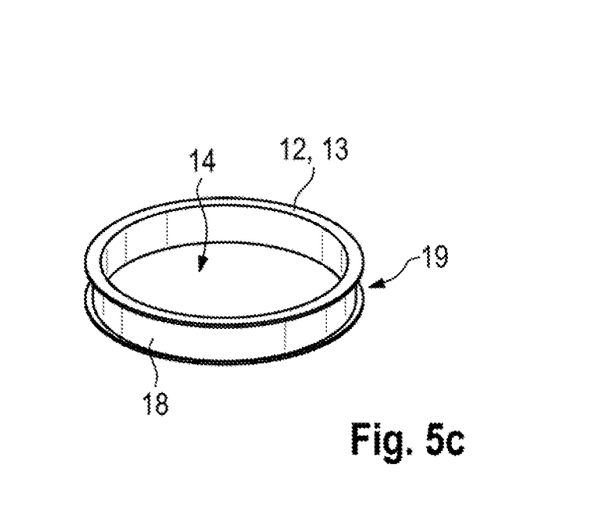
Figure 5D:
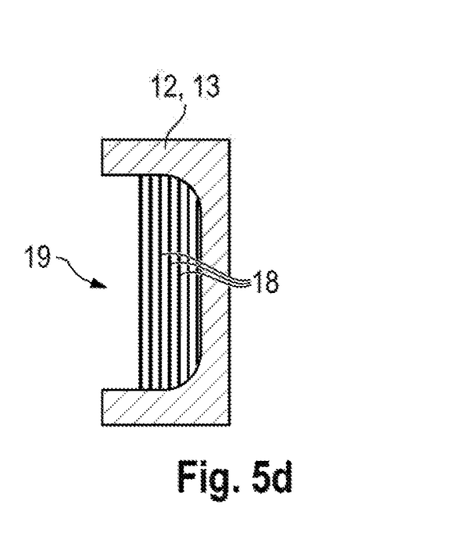

Here, in accordance with FIG. 5d which shows a cross section through FIG. 5c, a plurality of layers comprising unidirectional straps 18 which all run around in the circumferential direction of the respective bearing body 12, 13 are positioned in the groove 19 of the bearing bodies 12, 13 which are configured as metallic rings.

The outer shell 17 of the connecting strut 10, which outer shell 17 is likewise formed from a fiber reinforced plastic, surrounds the hollow body 11 completely on the outer side; the outer shell 17 wraps around the bearing bodies 12, 13 in sections, leaving the bearing sockets 14 free on the circumference thereof.

Here, at least 40% and at most 60% of fibers of said outer shell 11 are provided by unidirectional fibers, and the rest are provided by fibers of a multidirectional woven fiber fabric or knitted fiber fabric. 50% or approximately 50% of the fibers of the outer shell 17 are preferably unidirectional fibers, and the rest are fibers of a multidirectional woven fiber fabric or knitted fiber fabric.

As has already been stated, fibers of the multidirectional woven fiber fabric or knitted fiber fabric are fibers which form a woven fabric or knitted fabric. The fibers of the woven fiber fabric or knitted fiber fabric in the outer shell 11 cross one another, run transversely with respect to the longitudinal direction, and enclose an angle of greater than 0° and less than 90°, preferably an angle of 45° or approximately 45°, with the longitudinal direction of the connecting strut 11.

The hollow body 11 is contoured in an arch-like manner in cross section. At its two ends which lie opposite one another and in the region of which the bearing bodies 12, 13 are positioned, boundary walls 20 which converge in an arch-like manner enclose an angle α which is between 40° and 60°, and is preferably 50° or approximately 50°. This is particularly preferred for absorbing compressive forces.

Figure 1:
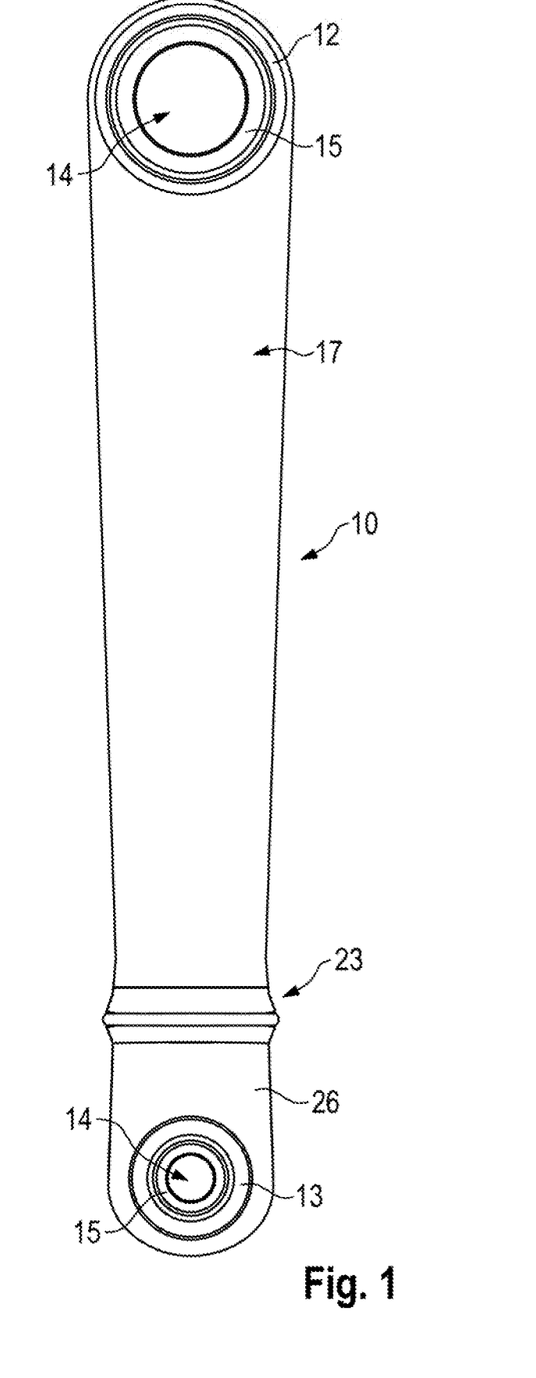
FIG. 1 shows a plan view of a first connecting strut according to aspects of the invention.
Figure 2:
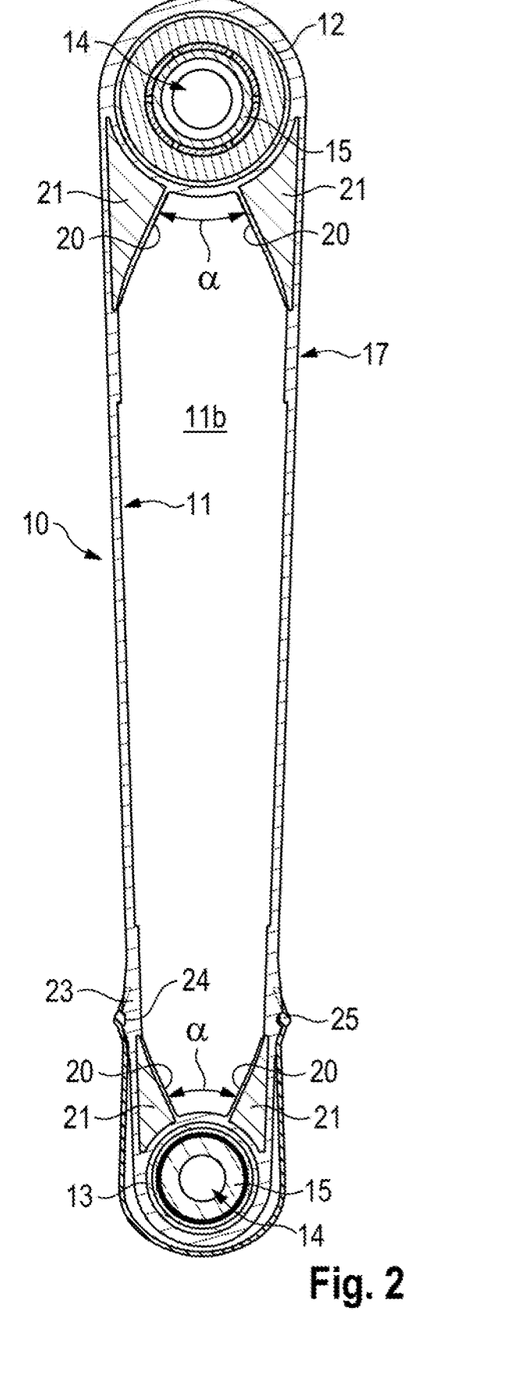
FIG. 2 shows a cross section through the connecting strut from FIG. 1.
Figure 3:
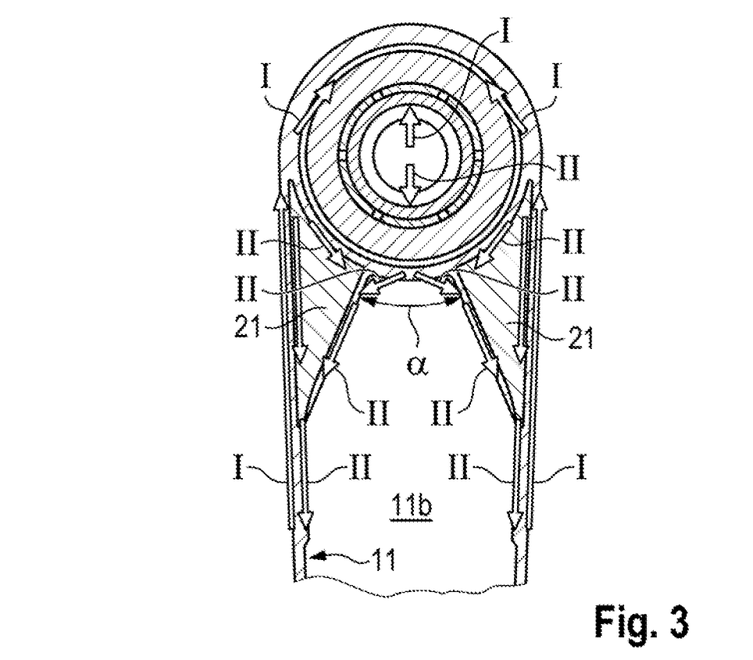
FIG. 3 shows the detail III with force arrows.
Figure 4:
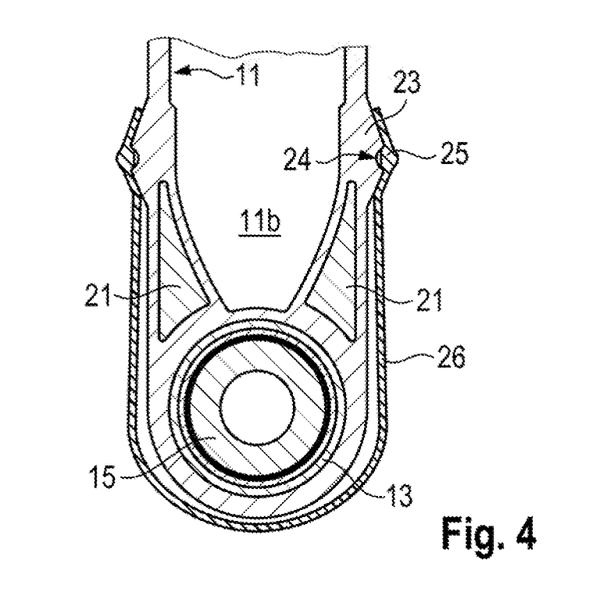
FIG. 4 shows the detail IV.

FIG. 3 uses first arrows I to visualize tensile forces which act on the connecting strut 10 and uses second arrows II to visualize corresponding compressive forces. Tensile forces I are absorbed mainly by the straps 16 which preferably extend in the longitudinal direction of the connecting strut 10. Compressive forces II are transmitted to the hollow body 11, to be precise via the ends of the hollow body 11 which are contoured in an arch-like manner and on which the bearing bodies 12, 13 act.

In order to assist the force introduction of compressive forces into the hollow body 12, starting from the bearing bodies 12, 13, inserts 21 are positioned between the ends of the hollow body 11 and the bearing bodies 12, 13.

Two inserts 21 of this type are preferably arranged in the region of each end of the hollow body 11 between the respective end of the hollow body 11 and the respective bearing body 12, 13 (see, in particular, FIG. 5a), the inserts 21 filling cavities between the ends of the hollow body 11 which are contoured in an arch-like manner and the ring-like bearing bodies 12, 13.

Here, the inserts 21 are manufactured from a fiber reinforced material, the fibers of the inserts 21 being provided by fibers of a multidirectional woven fiber fabric or knitted fiber fabric, to be precise up to 100% of them are preferably provided by fibers of a multidirectional woven fiber fabric or knitted fiber fabric.

The inserts 21 can be held via unidirectional straps 22 (see FIG. 5b) in the region of the ends of the hollow body 11. Said unidirectional straps 22 preferably enclose an angle of 90° with the longitudinal direction of the connecting strut 10. Said unidirectional straps 22 wrap around the ends of the hollow body 11 and the inserts 21 on the outside at least in sections.

Figure 5E:
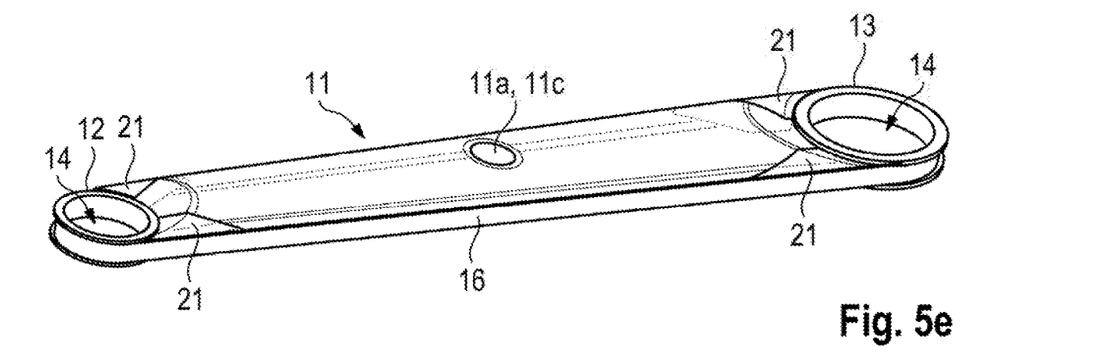

The unidirectional straps 26 which extend over the hollow body 11 and over the bearing bodies 12, 13 in the longitudinal direction of the connecting strut (see FIG. 5e) cover both the inserts 21 and the unidirectional straps 22 on the outside in sections.

In the exemplary embodiment of FIGS. 1 to 4, a thickened portion 23 with a groove 24 for the entry of a sealing element 25 of a protective cap 26 is configured in the region of an end of the connecting strut 10, to be precise in the region of one of the two opposite ends of the hollow body 11.

Here, the thickened material portion 23 is provided by at least one groove piece 27 which is formed from a fiber reinforced plastic and is positioned in the region of the respective end of the hollow body between the straps 16, which are guided on the bearing bodies 12, 13 and extend along the hollow body 11, and the outer shell 17. In contrast to this, a groove piece 27 of this type can also be attached on the outer shell 17 on the outside. The respective groove piece 27 is provided by fibers of a multidirectional woven fiber fabric or knitted fiber fabric, to be precise 100% of said respective groove piece 27 is preferably provided by fibers of a multidirectional woven fiber fabric or knitted fiber fabric.

The hollow body 11, the outer shell 17 and the possibly present inserts 21 and groove pieces 27 are preferably manufactured from a carbon fiber reinforced material. The straps 16, 19 and 22 are preferably manufactured from carbon fibers.

Figure 6:
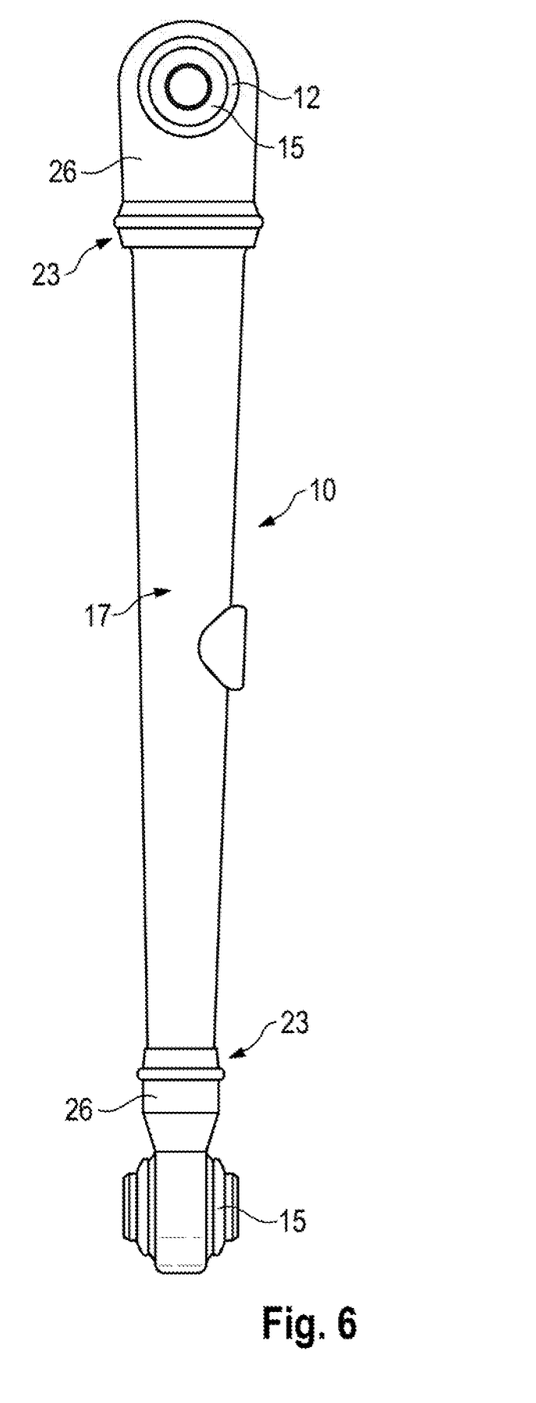
FIG. 6 shows a plan view of a second connecting strut according to aspects of the invention.
Figure 7:
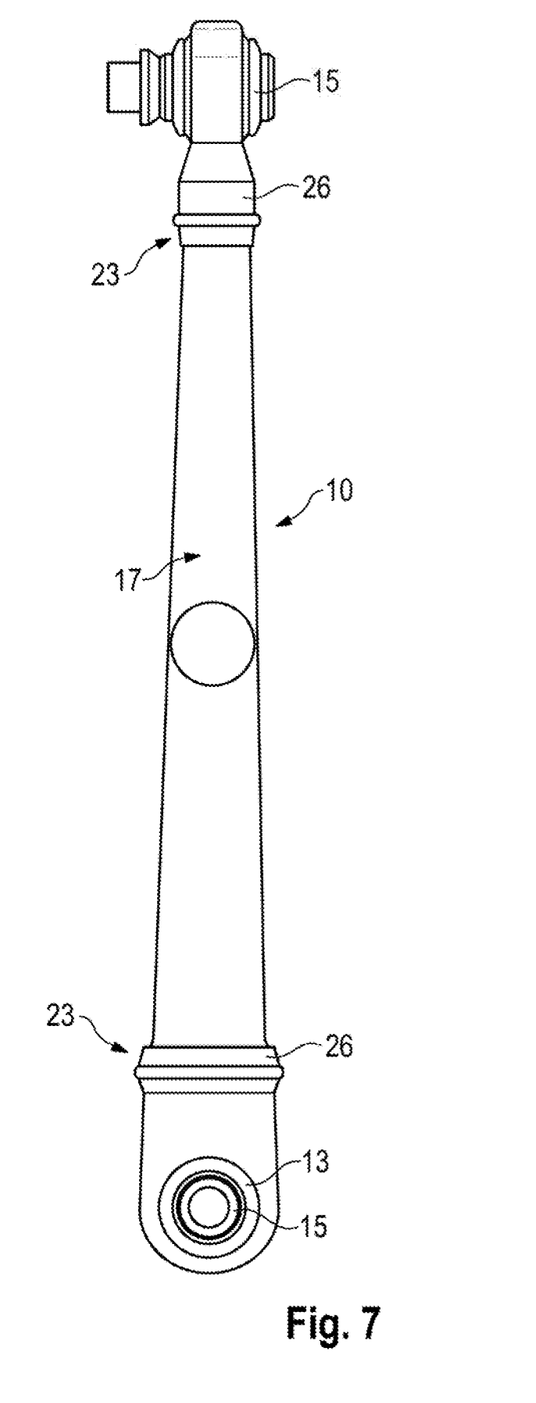
FIG. 7 shows the connecting strut from FIG. 6 in a plan view which is rotated by 90°.

In FIGS. 1 to 4, the bearing bodies 12, 13 have an identical orientation, and accordingly axes of bearing sockets 14 of said bearing bodies 12, 13 run in parallel. In contrast, FIGS. 6 and 7 show one exemplary embodiment, in which the bearing bodies 12, 13 and therefore the bearing sockets 14 which are provided by the bearing bodies are rotated by 90° with respect to one another, with the result that the axes of the bearing sockets 14 then do not run in parallel but rather perpendicularly with respect to one another. Reference can be made to the above statements with regard to the remaining details, however.

In the exemplary embodiment of FIGS. 6 and 7, a protective cap 26 engages on the two ends of the connecting strut 10, with the result that there are groove pieces 27 for forming the respective thickened material portion 23 which provides the respective groove 24 at the two ends of the connecting strut 10 adjacently with respect to the ends of the hollow body 11.

Figure 8:
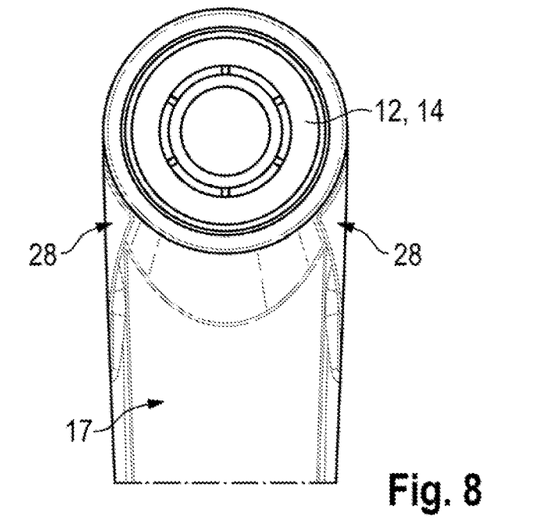
FIG. 8 shows a detail of a third connecting strut according to aspects of the invention.
Figure 9:
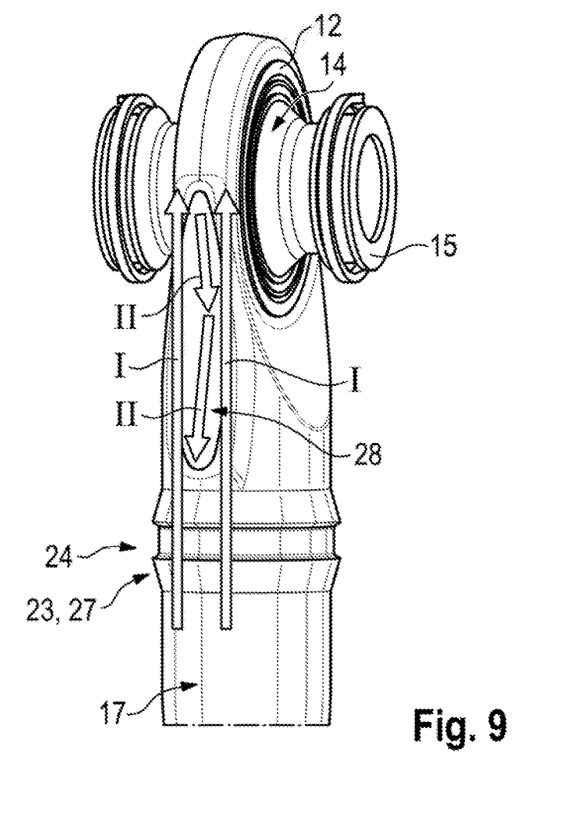
FIG. 9 shows the detail from FIG. 8 in a perspective view.

FIGS. 8 and 9 show a detail of a connecting strut 10 in accordance with a further exemplary embodiment of the invention, which connecting strut 10 does not have any inserts 21 in contrast to the exemplary embodiment of FIGS. 1 to 4 and FIGS. 6 and 7. As a result of the omission of the inserts 21, pocket-like depressions 28 are then formed in the transition region between the ends of the hollow body 11 and the bearing bodies 12, 13. The straps 16 which are guided on the bearing bodies 12, 13 and extend in the direction of the respective opposite bearing body 13, 12 along the hollow body 11 then extend into said pocket-like depressions 28.

As can be gathered from FIGS. 5a to 5g, the procedure for manufacturing the connecting strut 10 which is shown in FIGS. 1 to 4 is such that first of all the hollow body 11 is provided, and in each case two inserts 21 are arranged in the region of its opposite ends (see FIG. 5a). The inserts 21 are fastened to the hollow body 11 via the unidirectional straps 22 (see FIG. 5b) which extend transversely with respect to the longitudinal direction of the hollow body 11. Subsequently, the metallic, ring-like bearing bodies 12, 13 are provided, around which a plurality of unidirectional straps 18 are wound in a circumferential manner so as to preferably run in the circumferential direction (see FIGS. 5c, 5d), which straps 18 serve for the improved connection of the bearing bodies 12, 13 to the hollow body 11 and the unidirectional straps 16.

Subsequently, the unidirectional straps 16 are provided (see FIG. 5e) which, starting from the bearing bodies 12, 13, extend over the hollow body 11 in the direction of the respective opposite bearing body 13, 12. Here, the straps 16 can extend merely in sections over the hollow body 11, preferably on a shortest path, starting from a bearing body 12, 13, in the direction of the respective other bearing body 13, 12. The straps 16 absorb primarily tensile forces I. Compressive forces II are transmitted by the bearing bodies 12, 13, preferably via the inserts 21, to the ends of the hollow body 11 which are contoured in an arch-like manner.

Figure 5F:
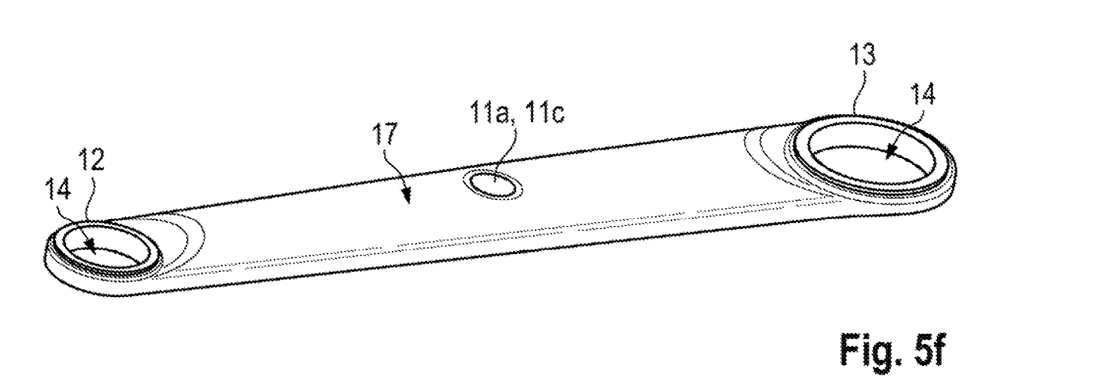
Figure 5G:
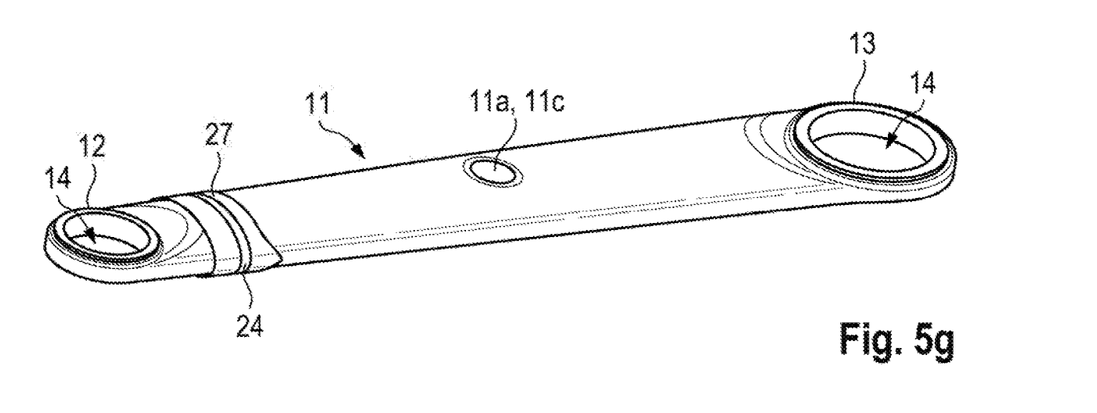

Subsequently, the outer shell is formed (see FIG. 5f). The outer shell 17, which is likewise manufactured from a fiber reinforced plastic and comprises both unidirectional fibers and fibers of a multidirectional woven fiber fabric or knitted fiber fabric which preferably enclose an angle of greater than 0° and less than 90° with the longitudinal direction of the hollow body 11, serves to distribute the load and to increase the transverse tensile strength. The groove pieces 27 can be attached to the outer shell 17 on the outside (see FIG. 5g).

The connecting strut 10 according to aspects of the invention has a low weight and can securely and reliably absorb high tensile forces and compressive forces which act on the connecting strut 10 during operation. Here, the connecting strut 10 is preferably a chassis component, in particular a chassis link.

What is claimed is:

1. A connecting strut of a motor vehicle, the connecting strut comprising:
    a hollow body extending in an axial direction and being composed of a fiber reinforced plastic,
    a first bearing body which is positioned at a first end of the hollow body,
    a second bearing body which is positioned at a second end of the hollow body,
    one or more straps for absorbing at least tensile forces which act on the connecting strut during operation, the straps being guided on the bearing bodies, the one or more straps extending in a circumferential direction, starting from a respective bearing body, along the hollow body, in a direction of a respective opposite bearing body,
    inserts positioned between one of the ends of the hollow body and the bearing body at said one of the ends of the hollow body, and
    an insert strap extending in a radial direction about the hollow body and the inserts for securing the inserts to said hollow body, wherein the insert strap is separate from said one or more straps,
    an outer shell composed of a fiber reinforced plastic, the outer shell at least partially surrounding an exterior of the hollow body, the inserts, the insert strap, the bearing bodies and the one or more straps.

2. The connecting strut as claimed in claim 1, wherein at least 70% and at most 90% of fibers of the hollow body are unidirectional fibers, and remaining fibers are multidirectional woven fiber fabric or knitted fiber fabric.

3. The connecting strut as claimed in claim 1, wherein the hollow body is contoured as an arch in cross section.

4. The connecting strut as claimed in claim 1, wherein at least 40% and at most 60% of fibers of the outer shell are unidirectional fibers, and remaining fibers are multidirectional woven fiber fabric or knitted fiber fabric.

5. The connecting strut as claimed in claim 1, further comprising bearing body straps each being wound around an entire circumference of a respective bearing body, wherein the bearing body straps are separate from said one or more straps.

6. The connecting strut as claimed in claim 5, wherein the bearing bodies are metallic elements, and the bearing body straps comprise unidirectional fibers or unidirectional straps.

7. The connecting strut as claimed in claim 1, wherein the inserts are made from fiber reinforced plastic.

8. The connecting strut as claimed in claim 7, wherein fibers of the inserts are multidirectional woven fiber fabric or knitted fiber fabric.

9. The connecting strut as claimed in claim 1, wherein the insert strap extends transversely with respect to a longitudinal direction of the connecting strut.

10. The connecting strut as claimed in claim 1 further comprising groove pieces composed of fiber reinforced plastic, each groove piece having one groove for the engagement of a sealing element of a protective cap, the groove pieces being positioned in a region of the two opposite ends of the hollow body between the one or more straps and the outer shell or so as to adjoin the outer shell on the outside.

11. The connecting strut as claimed in claim 10, wherein fibers of the groove pieces are fibers of a multidirectional woven fiber fabric or knitted fiber fabric.

12. The connecting strut as claimed in claim 10, wherein the hollow body, the outer shell and groove pieces each comprise carbon fiber reinforced plastic.

13. The connecting strut as claimed in claim 1, wherein each of the one or more straps extends on a shortest path along the hollow body between the bearing bodies.

14. The connecting strut as claimed in claim 1, wherein each of the one or more straps comprises carbon fibers.

15. The connecting strut as claimed in claim 1, further comprising a bearing pin positioned through an opening in one of the bearing bodies.

\* \* \* \* \*